Patented July 3, 1934

1,965,301

UNITED STATES PATENT OFFICE 1,965,301

PROCESS FOR PRODUCING MIXED FERTILIZERS

Heinrich Tramm, Oberhausen-Holten, Germany, assignor to Ruhrchemie Aktiengesellschaft, Oberhausen-Holten, Germany No Drawing. Application January 22, 1932, Serial No. 588,238. In Germany January 29, 1931

15 Claims. (Cl. 71—7)

Mixtures of ammonium nitrate and ammonium phosphate are being used more and more for fertilizing purposes. Either these mixtures are used alone or they may serve as the raw materials for the production of complete fertilizers, which, in addition to the two granular nutrients which are present in a mixture of ammonium nitrate and ammonium sulphate, contain potassium salts or other components acting as fertilizers or increasing the fertilizing action.

Mixtures of ammonium phosphates and ammonium nitrates have hitherto been produced in the following manner: Raw phosphates were decomposed with nitric acid in such quantity that the phosphoric acid was simultaneously converted into soluble form. By adding ammonium sulphate the dissolved calcium was separated out as calcium sulphate. By evaporation, ammonium phosphate was obtained together with ammonium nitrate from the separated out solution.

The products obtained in this manner have the great disadvantage that the proportion of nitrogen to phosphoric acid is determined by the quantity of phosphoric acid entering into the process. For this reason it is impracticable to employ very low-grade raw phosphates where a considerable content of calcium has to be removed from the decomposing solution, so that the final product obtained is a mixture of ammonium nitrate and ammonium phosphate in which nitrogen is present in a much larger proportion than phosphoric acid.

It has been found that crude phosphates of any desired composition, but particularly low grade crude phosphates, can be treated to produce mixed fertilizers of any desired composition containing nitrogen and phosphorus. For this purpose crude phosphates are split up with the calculated volume of nitric acid until the phosphoric acid has been rendered soluble. The calcium is precipitated from the split up solution by means of the ammonium salts of such acids as form insoluble salts with the calcium, as for example, by the addition of ammonium sulphate. In the split up solution which has been obtained ammonium phosphate and ammonium nitrate are present in the proportion determined by the amount of phosphoric acid and calcium contained in the crude phosphate, which proportion remains practically unaltered by the evaporation of the solution down to dryness. It is possible, however, by treating the split up product evaporated down to dryness directly to obtain any desired proportion between the two components nitrogen and phosphoric acid, either the whole of the salts separated consisting of ammonium nitrate and ammonium phosphates or as large a proportion thereof as may be desired being treated with gaseous or liquid ammonia until the nitrate is dissolved. In this way the ammonium nitrate is dissolved without the phosphate passing into solution. The ammonium phosphate which is separated out in solid form from the salt mixture, is then advantageously added to the portion of the ammonium salts which have not been extracted with ammonia after previous removal of the excess ammonia. The ammonium nitrate separated from the salt mixture may however, be added after the excess of ammonia has been expelled, to that portion of the salts which have not been dissolved out.

The ammonium phosphate or the ammonium nitrate, after separation, may be employed for the production of any other fertilizer desired, in which case the ammonia employed to dissolve the ammonium nitrate may be added to the fertilizer advantageously combined with acids.

Another method of preparing mixed fertilizers using the present process, is to neutralize the whole or any desired proportion of the ammoniacal solution of the ammonium nitrate with acids, acid anhydrides or acidic salts. If raw phosphates with a high content of calcium carbonate are prepared according to the process of this invention, primarily mixtures are secured in which ammonium nitrate is present in a quantity which is far in excess of ammonium phosphate. In this case the process is carried out in such a way that, for example, the primarily obtained mixture of ammonium nitrate and ammonium phosphate is divided in approximately equal parts by weight. One part is treated with gaseous or liquid ammonia. The ammonium phosphate remaining when this treatment is carried out is mixed, advantageously after the driving out of the remaining ammonia, with that part from the primary decomposition which is not treated with ammonia. By this means a product is obtained in which ammonium nitrate and ammonium phosphate are present in such proportions as to be of practical use as fertilizers. The ammoniacal solution of ammonium nitrate obtained during the lixiviating may then be employed according to requirements for producing other fertilizers. The saturation of the ammoniacal solution of ammonium nitrate may be carried out in the presence of solid substances, while inert substances, mixtures of inert substances and fertilizer salts, or fertilizer salts or mixtures of fertilizer salts may be employed. In this method of carrying out the process, the whole of the components of the final product may be mixed together at once or separately.

The present process has the advantage of the production of ammonium nitrate and ammonium phosphate together, particularly from low grade and crude phosphates, in such a manner that mixed fertilizers containing any desired proportion of nitrogen and phosphoric acid are obtained directly from the split up mixtures produced by evaporation. It therefore renders unnecessary the separate production of these two components, that is to say of the ammonium nitrate and the ammonium phosphate which are the principal ones required for the manufacture of mixed and complete fertilizers. At the same time it affords the possibility of making use of crude phosphates, which it has hitherto been impossible to use for the manufacture of fertilizers, on a very large scale for commercial purposes.

Example I 1 kg. of Algerian phosphate (with 58% of $Ca_3(PO_4)_2$ and 30% of $CaCO_3$) is, by stirring, decomposed with 2.33 kg. of 40% (by weight) nitric acid ($d=1.251$). To the decomposed substance is added 1.14 kg. of very finely ground ammonium sulphate, the gypsum is filtered off and the weakly acid mixture of monoammonium phosphate and ammonium nitrate is vapourized until almost complete dryness is obtained. In the salt mixture obtained the nutrients have the proportion represented $N:P_2O_5=1.7:1$. In order to arrive at the proportion 1:1, the whole mass is extracted with about 1.1 kg. of $NH_3$ in the form of gas or liquid, whereupon the ammonium phosphate is separated out by filtration, the ammonia carried by the diphosphate is driven off and about 500 grams of diammonium phosphate are obtained. The ammonia is driven off from the ammoniacal filtrate by heat whereupon 463 grams of the residue of solid ammonium nitrate is added to the 500 grams of diammonium phosphate. About 1 kg. is obtained of mixed fertilizer according to the equation $N:P_2O_5=1:1$ and also 725 grams of ammonium nitrate.

Example II 2.35 kg. of Algerian phosphate are decomposed with 5.48 kg. of 40% nitric acid; after the addition of 2.68 kg. of sulphate the mixture filtered from the gypsum is evaporated from dissolved monoammonium phosphate and ammonium nitrate until the residue is almost dry. About 57% of this moist crystalline mass is by the use of 1.5 kg. of $NH_3$ broken up into solid ammoniacal diammonium phosphate and a solution of ammonium nitrate in $NH_3$. The phosphate thus obtained is added to the 43% crystalline mass that was not extracted and thus is obtained about 2.3 kg. of mixed fertilizer according to the equation of $N:P_2O_5=1:1$. On the other hand by driving out the ammonia there is obtained 1.6 kg. of solid ammonium nitrate.

The method of preparation hereinbefore described can be further improved by so adjusting the amount of acid in the completed product that the ammonium phosphate is present practically entirely in the form of monoammonium phosphate. The residue from the solution produced by the splitting up of phosphoric acid contains, in addition to varying quantities of ammonium nitrate and ammonium phosphate, continually varying quantities also of calcium salts according to the kind of ammonium salts used, for example calcium sulphate if the ammonium salt employed be ammonium sulphate. When the dry residue is extracted with ammonia the calcium salts react and form insoluble calcium phosphates with the ammonium phosphates. A portion of the phosphoric acid which is soluble in water is consequently converted into the form which is insoluble in water. The risk of this retroaction of the water-soluble phosphoric acid is now eliminated by the ammonium phosphate being converted by the addition of acid into mono-ammonium phosphate. This conversion may at the same time, be brought about by the addition of other salts, for which chiefly potassium salts are used alone, or in mutual admixture or in admixture with other salts. The excess of acid is such that it suffices for the conversion of the ammonium phosphate into mono-ammonium phosphate. In this way the formation of phosphoric acid insoluble in water when the fertilizer is stored or used is precluded. This improvement permits of the manufacture of mixed fertilizers, all the components of which are present in a form in which they are soluble in water.

In carrying out the second part of the process, a start may be made with, for example, mixtures of ammonium nitrate and ammonium phosphate and these may be combined in an agitator with mixtures of potassium nitrate and nitric acid. The same solutions may be combined with a mixture of potassium nitrate and sulphuric acid. It is also possible completely to separate the mixed ammonium nitrate and ammonium phosphate from each other, then to mix the ammonium phosphate (which is practically free from ammonium nitrate) with the potassium salt and the particular acid employed and to combine to form a salt as large a portion as may be desired of the ammonium nitrate previously separated in the form of Divers solution with the mixture of ammonium phosphate, potassium and acid to form one salt.

Instead of potassium nitrate any other salts, such as potassium chloride, potassium sulphate and the like, may be used for the production of mixed or complete fertilizers containing potassium. The potassium salts may also be added to other salts which it may be desired to introduce into the complete fertilizers. Other salts may of course be used instead of potassium salts.

Example III 1000 kg. of crude phosphate, containing in round numbers, 66% of tricalcium phosphate and 20% of calcium carbonate are split up by means of 1576 kg. of 50% nitric acid and 1107 kg. of a saturated solution of ammonium sulphate. The mixture of mono-calcium phosphate and calcium nitrate produced by the splitting up of the crude phosphate with nitric acid, is converted by the addition of ammonium sulphate into a mixture of 490 kg. of mono-ammonium phosphate and 1001 kg. of ammonium nitrate. The mixture is evaporated down to dryness, 322 kg. of liquid ammonia added to dissolve 966 kg. of ammonium nitrate and the mass filtered from the ammoniacal solution of ammonia nitrate obtained, the residue being neutralized with 844 kg. of 50% nitric acid to which 648 kg. of 96% potassium chloride are added. 1831 kg. of mixed salts are formed which after drying contain the nutrients in the following proportions:

16.5% N   16.5% $P_2O_5$   21.5% $K_2O$

The amounts of ammonium nitrate dissolved out of the original mixture of ammonium nitrate and mono-ammonium phosphate and consisting of a solution of 966 kg. of ammonium nitrate in 322 kg. of liquid ammonia, may be used in any other way that may be desired.

I claim:

1. A process for producing mixed fertilizers containing nitrogen and phosphoric acid, of a composition which can be regulated, by the decomposition of raw phosphates by the use of nitric acid, consisting in treating the decomposing solution with ammonium salts which give a difficultly soluble calcium salt and thereby converting the phosphoric acid contained in the decomposing solution as well as the calcium nitrate produced into ammonium phosphate and ammonium nitrate, evaporating the solution containing ammonium salts practically to the dry stage, treating the practically dry salt mixture with practically pure ammonia to dissolve out the whole of the nitrate, evaporating the ammoniacal solution almost completely and admixing any desired quantity of the ammonium nitrate with the ammonium phosphate obtained as residue during the lixiviation with ammonia.

2. A process for producing mixed fertilizers containing nitrogen and phosphoric acid, of a composition which can be regulated, by the decomposition of raw phosphates by the use of nitric acid, consisting in treating the decomposing solution with ammonium sulphate and thereby converting the phosphoric acid contained in the decomposing solution as well as the calcium nitrate produced into ammonium phosphate, ammonium nitrate and calcium sulphate, separating by filtration the separated-out calcium sulphate from the solution containing the ammonium salts, evaporating the said solution practically to the dry state, treating the practically dry salt mixture with practically pure ammonia to dissolve out the whole of the ammonium nitrate, evaporating the ammoniacal solution almost completely and admixing any desired quantity of the ammonium nitrate with the ammonium phosphate obtained as residue during the lixiviation with ammonia.

3. A process for producing mixed fertilizers containing nitrogen and phosphoric acid, of a composition which can be regulated, by the decomposition of raw phosphates by the use of nitric acid, consisting in treating the decomposing solution with ammonium sulphate and thereby converting the phosphoric acid contained in the decomposing solution as well as the calcium nitrate produced into ammonium phosphate, ammonium nitrate and calcium sulphate, separating by filtration the separated-out calcium sulphate from the solution containing the ammonium salts, evaporating the said solution almost completely, treating a part of the practically dry salt mixture with practically pure ammonia to lixiviate therefrom the whole of the content of ammonium nitrate, separating the ammoniacal solution and evaporating the ammonium nitrate completely, and mixing the mixture of ammonium nitrate and the ammonium phosphate not treated with ammonia with the residue of ammonium phosphate left after the lixiviation with ammonia for the production of the desired fertilizer.

4. A process for producing mixed fertilizers containing nitrogen and phosphoric acid, of a composition which can be regulated, by the decomposition of raw phosphates by the use of nitric acid, consisting in treating the decomposing solution with ammonium sulphate and thereby converting the phosphoric acid contained in the decomposing solution as well as the calcium nitrate produced into ammonium phosphate, ammonium nitrate and calcium sulphate, separating by filtration the separated-out calcium sulphate from the solution containing the ammonium salts, evaporating the said solution almost completely, treating a part of the practically dry salt mixture with practically pure ammonia to lixiviate therefrom the whole of the content of ammonium nitrate, separating the ammoniacal solution and evaporating the ammonium nitrate to the dry state, and mixing the mixture of ammonium nitrate and ammonium phosphate which has not been treated with ammonia with the ammonium nitrate obtained by lixiviation with ammonia for the production of the required fertilizer.

5. A process for producing mixed fertilizers containing nitrogen and phosphoric acid, of a composition which can be regulated, by the decomposition of raw phosphates by the use of nitric acid, consisting in treating the decomposing solution with ammonium sulphate and thereby converting the phosphoric acid contained in the decomposing solution as well as the calcium nitrate produced into ammonium phosphate, ammonium nitrate and calcium sulphate, separating by filtration the separated-out calcium sulphate from the solution containing the ammonium salts, evaporating the said solution almost to dryness, treating the practically dry salt mixture with practically pure ammonia to dissolve out the whole of the nitrate, evaporating the ammoniacal solution almost completely, admixing any suitable part of the ammonium nitrate with the ammonium phosphate obtained as residue during the lixiviation with ammonia, and adding to the ammonium nitrate ammonium phosphate fertilizers produced a quantity of free acid such that the ammonium phosphate is present practically entirely in the form of mono-ammonium phosphate.

6. A process according to claim 3, comprising the step of adding to the fertilizers produced and containing ammonium nitrate and ammonium phosphate such a quantity of free acid that the ammonium phosphate is present practically in the form of mono-ammonium phosphate.

7. A process according to claim 4, comprising the step of adding to the fertilizers produced and containing ammonium nitrate and ammonium phosphate such a quantity of free acid that the ammonium phosphate is present practically in the form of mono-ammonium phosphate.

8. A process for producing mixed fertilizers containing nitrogen and phosphoric acid, of a composition which can be regulated, by the decomposition of raw phosphates by the use of nitric acid, consisting in treating the decomposing solution with ammonium sulphate and thereby converting the phosphoric acid contained in the decomposing solution as well as the calcium nitrate produced into ammonium phosphate, ammonium nitrate and calcium sulphate, separating by filtration the separated-out calcium sulphate from the solution containing the ammonium salts, evaporating the said solution almost completely to dryness, treating the practically dry salt mixture with practically pure ammonia to dissolve out the whole of the nitrate, evaporating the ammoniacal solution almost completely to dryness, admixing any suitable part of the ammonium nitrate with the ammonium phosphate obtained as residue during the lixiviation with ammonia, and adding to the ammonium nitrate ammonium phosphate fertilizers produced a quantity of nitric acid such that the ammonium phosphate is present practically entirely in the form of mono-ammonium phosphate.

9. A process according to claim 3, comprising the step of adding to the fertilizers obtained which contain ammonium nitrate and ammonium phosphate, nitric acid in such quantity that the ammonium phosphate is present practically entirely in the form of mono-ammonium phosphate.

10. A process according to claim 4, comprising the step of adding to the fertilizers obtained, which contain ammonium nitrate and ammonium phosphate, nitric acid in such quantity that the ammonium phosphate is present practically entirely in the form of mono-ammonium phosphate.

11. A process for producing mixed fertilizers containing nitrogen and phosphoric acid, of a composition which can be regulated, by the decomposition of raw phosphates by the use of nitric acid, consisting in treating the decomposing solution with ammonium sulphate and thereby converting the phosphoric acid contained in the decomposing solution as well as the calcium nitrate produced into ammonium phosphate, ammonium nitrate and calcium sulphate, separating by filtration the separated-out calcium sulphate from the solution containing the ammonium salts, evaporating the said solution almost completely to dryness, treating the practically dry salt mixture with practically pure ammonia to dissolve out the whole of the ammonium nitrate and mixing the diammonium phosphate from which the ammonium nitrate has been removed by washing with ammonia with nitric acid and charging it with that quantity of the ammoniacal solution of ammonium nitrate resulting from lixiviation with ammonia which is necessary to produce the desired proportion of nitrogen to phosphoric acid.

12. A process for producing mixed fertilizers containing nitrogen and phosphoric acid, of a composition which can be regulated, by the decomposition of raw phosphates by the use of nitric acid, consisting in treating the decomposing solution with ammonium sulphate and thereby converting the phosphoric acid contained in the decomposing solution as well as the calcium nitrate produced into ammonium phosphate, ammonium nitrate and calcium sulphate, separating by filtration the separated-out calcium sulphate from the solution containing the ammonium salts, evaporating the said solution almost completely to dryness, lixiviating the practically dry salt mixture with practically pure ammonia to dissolve out the whole of the ammonium nitrate, mixing the diammonium phosphate from which the ammonium nitrate has been removed by washing with ammonia with nitric acid and potassium salts and charging it thereafter with that quantity of the ammoniacal solution of ammonium nitrate resulting from the lixiviation with ammonia which is necessary to secure the desired proportion of nitrogen to phosphoric acid.

13. A process for producing mixed fertilizers containing controllable contents of nitrogen, phosphoric acid and potassium according to a modification of the process of claim 2, comprising the step of combining a mixture of a potassium salt and an acid with a mixture of ammonium nitrate and ammonium phosphate.

14. A process for producing mixed fertilizers containing controllable contents of nitrogen, phosphoric acid and potassium according to a modification of the process of claim 2, comprising the steps of separating the ammonium nitrate and ammonium phosphate and combining the ammonium phosphate practically free from ammonium nitrate with a mixture of a potassium salt and an acid.

15. A process for producing mixed fertilizers containing controllable contents of nitrogen, phosphoric acid and potassium according to a modification of the process of claim 4, comprising the step of adding potassium salts as a step in the process of the production of the complete fertilizer.

HEINRICH TRAMM.